United States Patent [19]

Brown

[11] Patent Number: 4,473,334

[45] Date of Patent: Sep. 25, 1984

[54] AUTOMOBILE LIFTING AND TOWING EQUIPMENT

[76] Inventor: Andrew M. Brown, 4535 E. 6th Ave., Denver, Colo. 80220

[21] Appl. No.: 303,535

[22] Filed: Sep. 18, 1981

[51] Int. Cl.³ ............................................. B60P 3/12
[52] U.S. Cl. .................................. 414/563; 414/428; 414/429; 212/189; 212/195; 212/231; 212/264; 293/106; 294/82 AH; 280/402
[58] Field of Search ............... 414/563, 402, 426, 428, 414/429, 545, 557, 556; 212/189, 195, 231, 264; 293/106; 294/103 R, 82 R, 82 AH, DIG. 2, 86 R; 280/402

[56] References Cited

U.S. PATENT DOCUMENTS

| 1,817,220 | 8/1931 | Young | 414/429 |
|---|---|---|---|
| 1,962,127 | 6/1934 | Balkema et al. | 414/429 |
| 2,252,534 | 8/1941 | Trotter | 414/428 |
| 2,985,317 | 5/1961 | Bannister | 212/195 |
| 3,690,482 | 9/1972 | Gaumont | 414/563 |
| 4,068,876 | 1/1978 | Muellner | 293/106 |
| 4,264,262 | 4/1981 | LoCodo | 280/402 |

FOREIGN PATENT DOCUMENTS

| 1142688 | 1/1963 | Fed. Rep. of Germany | 212/189 |
|---|---|---|---|
| 2608523 | 9/1977 | Fed. Rep. of Germany | 414/563 |

OTHER PUBLICATIONS

American Towman, vol. 3, No. 1, Jul./Aug. 1979, EKA Recovery Systems Advertisement.

Primary Examiner—Bruce H. Stoner, Jr.
Assistant Examiner—James E. Barlow
Attorney, Agent, or Firm—Wm. Griffith Edwards

[57] ABSTRACT

A truck for towing disabled vehicles is provided with a cab controlled or a remote controlled vehicle lifting assembly including pairs of claws which will automatically engage a pair of the wheels of a vehicle and enable the vehicle to be lifted and towed, the vehicle being carried on its own suspension system during towing. The assembly includes a crane mounted and arranged so that the load thereon is carried forward of the rear axle of the tow truck—this increases the tow capacity of the truck and provides stable operation of the crane. The claw assembly may be locked by a ratchet and strap arrangement which retains the vehicle wheels in the assembly in their forward position and prevents release due to jolts and bouncing.

28 Claims, 20 Drawing Figures

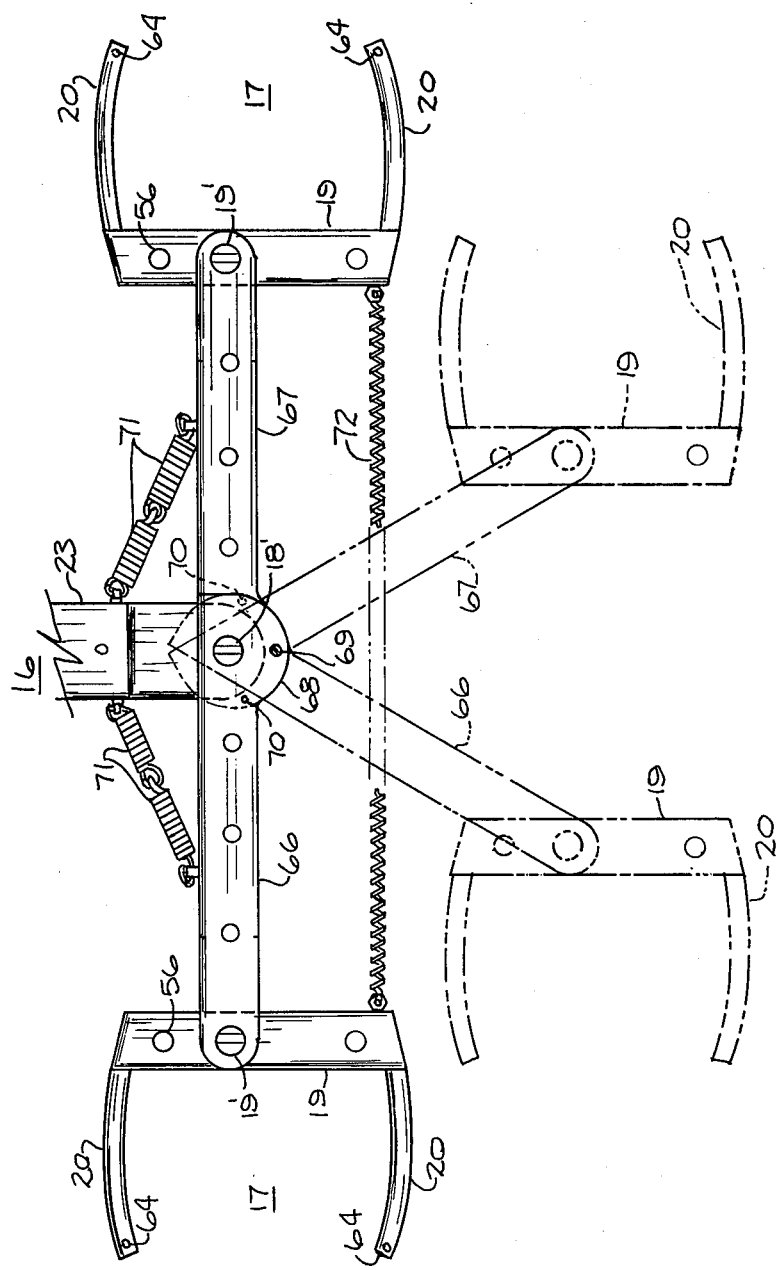

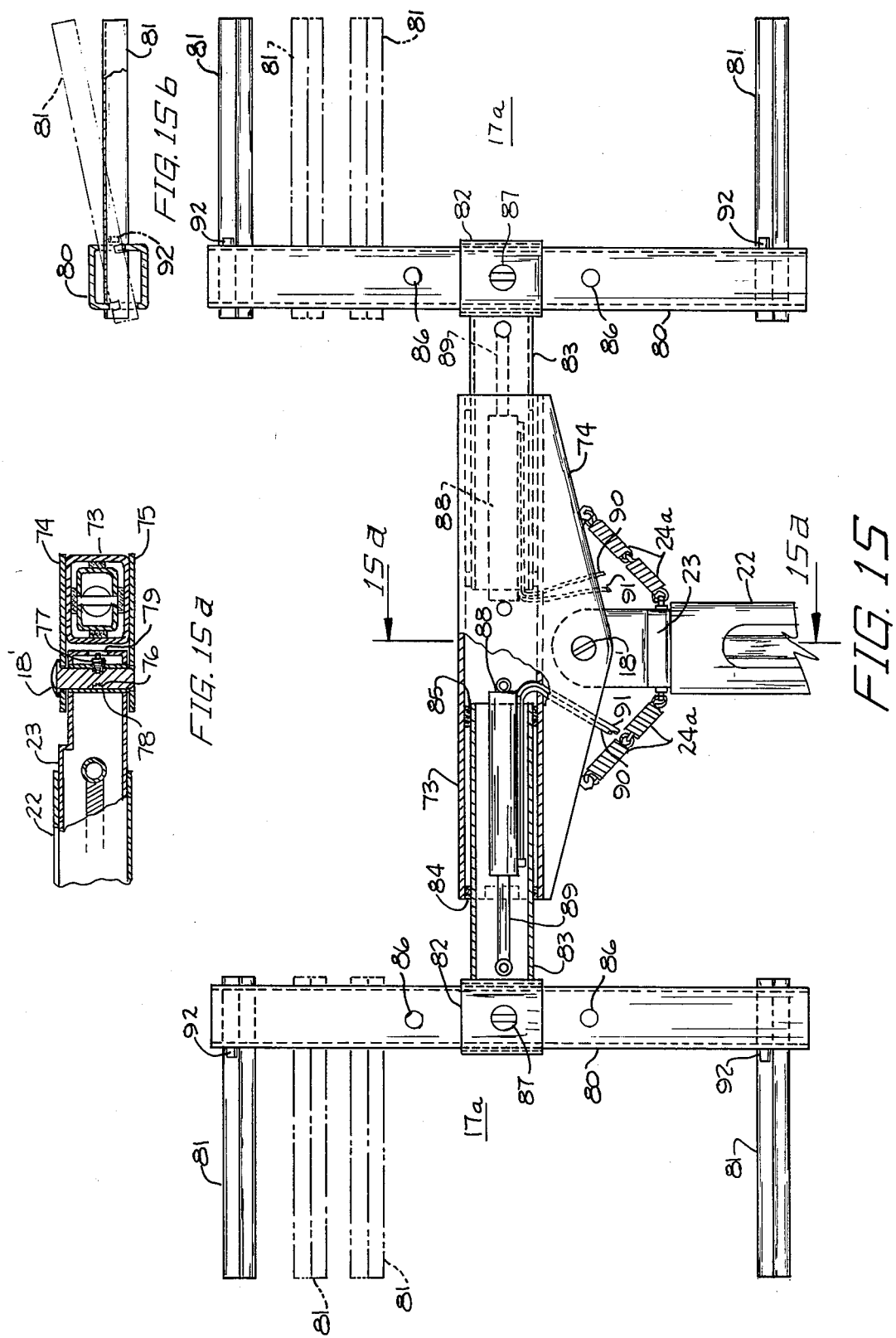

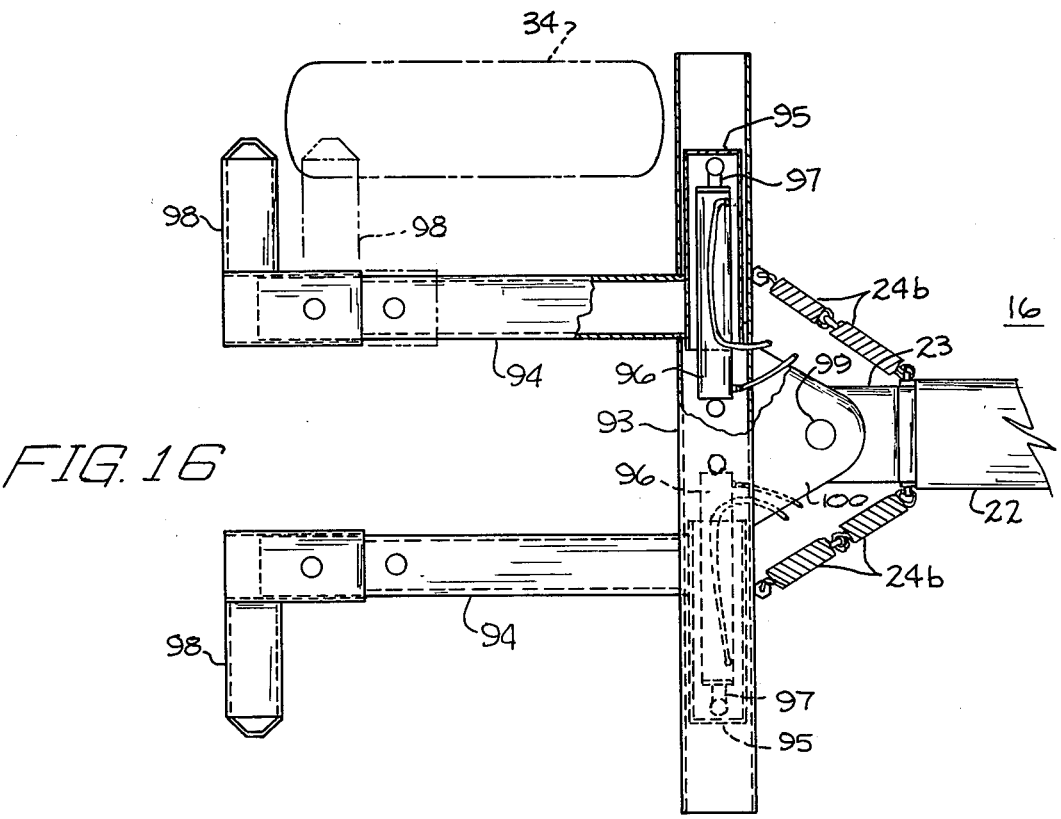

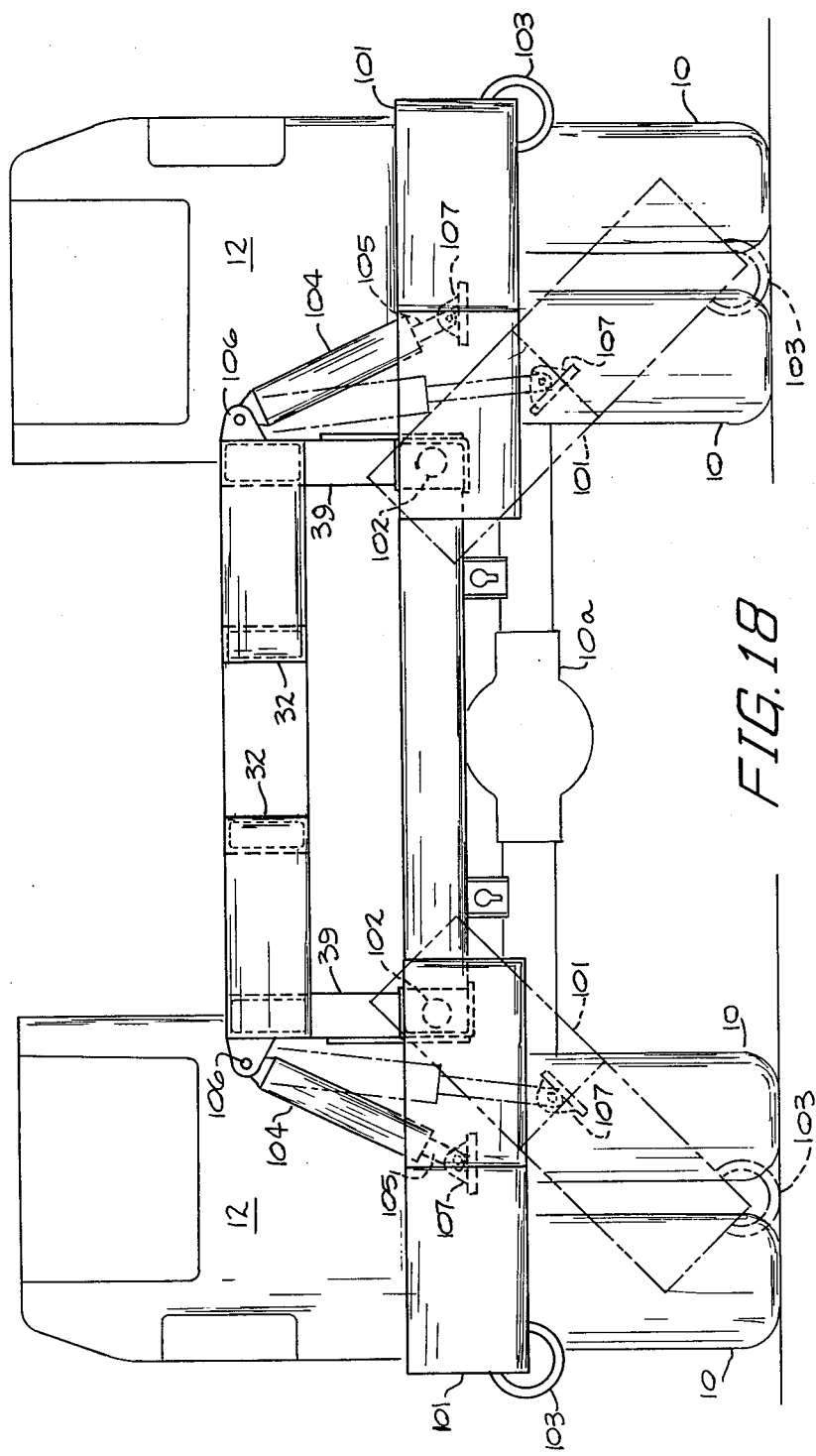

AUTOMOBILE LIFTING AND TOWING EQUIPMENT

This invention relates to equipment for lifting and towing automobiles and the like and particularly to an improved equipment for facilitating the removal of a disabled vehicle from lines of traffic and in many situations the operator can engage the vehicle wheels and lift the vehicle without leaving the cab of the tow truck; this minimizes danger for the driver in heavy traffic situations.

BACKGROUND OF THE INVENTION AND PRIOR ART

Various forms of equipment have been provided for attaching disabled vehicles to the cranes of tow trucks with a view toward minimizing the likelihood of damage to the towed vehicle. For example, a wide flexible sheet may be employed for engagement and contact with the vehicle instead of steel cables or chains. More recently tow trucks have been provided with cranes arranged to support a flat rigid framework in which a pair of automobile wheels may be cradled and the frame lifted to raise the automobile for towing. The crane is constructed so that the frame may be held adjacent the ground transversely of the automobile which is then pulled onto the frame with a pair of wheels on the frame where they are cradled upon lifting by the crane and the vehicle then towed away.

The heavy traffic on highways and the disabling of vehicles by accident or otherwise results in many occasions when a vehicle must be removed promptly to minimize the interference with traffic and the causing of slowdowns. Traffic accidents on heavily traveled highways present problems of maneuvering and using the towing vehicles in a manner to most effectively and quickly remove the disabled vehicle from the traffic lanes. Frequently vehicles in an accident are left close together and in positions making it difficult to reach the disabled vehicle and heavy traffic conditions greatly increase this difficulty. Accordingly it is an object of this invention to provide improved and more easily operated lifting and towing equipment which affords easier and more efficient operation in close quarters.

It is another object of this invention to provide a lifting equipment for vehicle towing trucks and the like which can be used in close quarters with minimum requirement for applying chains or cables to the disabled vehicle.

It is a further object of this invention to provide an improved equipment for lifting and towing disabled vehicles which is effective to lift and remove vehicles from close quarter traffic blocking situations.

It is a further object of this invention to provide a vehicle lifting and towing equipment including an improved arrangement whereby disabled vehicles may be lifted and removed with minimum likelihood of damage to the towed vehicle.

It is a further object of this invention to provide an improved vehicle lifting and towing equipment which may be positioned automatically for lifting the wheels of the vehicle to be towed without requiring the truck operator to leave the cab of the truck.

It is a further object of this invention to provide an improved vehicle lifting and towing equipment wherein the towed vehicle is carried on its own suspension system and damage to the vehicle during lifting and towing is minimized.

SUMMARY OF THE INVENTION

Briefly in carrying out the objects of this invention, in one embodiment thereof, a wheel engaging equipment is provided for use with the tow truck or the like having a crane with a boom portion or tow bar which may be positioned close to the ground and comprises a pair of claw members mounted on the end portion of the boom by a suitable mounting member which may be positioned to locate the claw members for engagement with the wheels of the vehicle to be towed. The claws are two-pronged and the prongs are of a length and spacing to fit below a vehicle wheel on respective sides of the ground engaging portion of the wheel. Upon lifting of the boom the claw members are raised and the wheels are cradled, trapped or captured in the members. The vehicle can then be lifted and towed away. The claw members may be postioned automatically without moving the vehicle to be towed, and in many situations the operator can engage the vehicle wheels and lift the vehicle without leaving the cab of the tow truck; this minimizes danger for the driver in heavy traffic situations.

BRIEF DESCRIPTION OF THE DRAWINGS

FIG. 14 is a plan view of another embodiment of the invention;

FIG. 15 is a plan view partly broken away and partly in section of the claw assembly of a further embodiment of the invention;

FIG. 15a is a sectional view along the line 15a—15a of FIG. 15;

FIG. 15b is a sectional view of one of the prongs of FIG. 15;

FIG. 16 is a plan view partly in section and partly broken away of a still further embodiment of the invention;

FIG. 17 is a side elevation view of the embodiment of FIG. 16; and

FIG. 18 is a rear end elevation view of the truck of FIG. 1 showing the combined bumper stabilizing devices.

DESCRIPTION OF THE PREFERRED EMBODIMENTS

Figure 1:
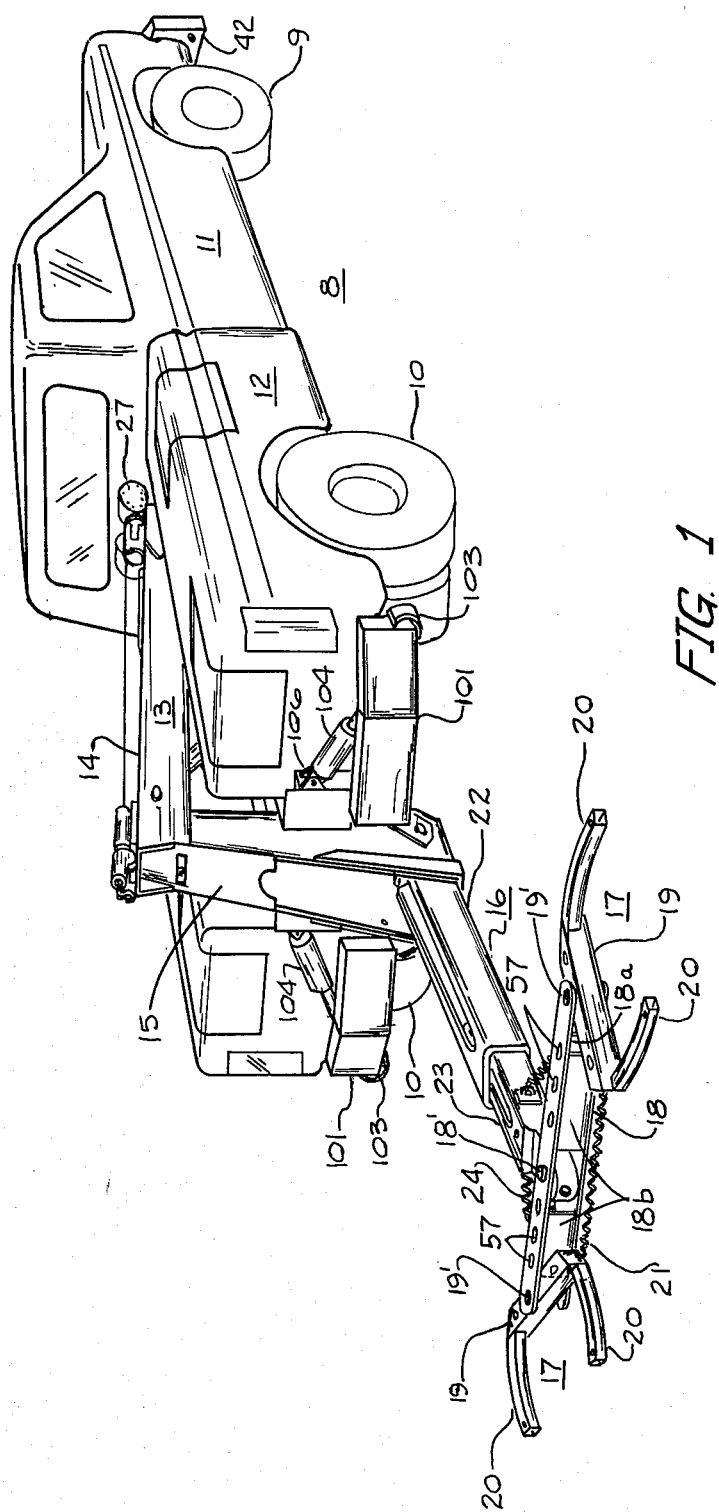
FIG. 1 is a perspective view of a towing truck provided with a lifting and towing equipment embodying the invention shown in its lowered position.
Figure 2:
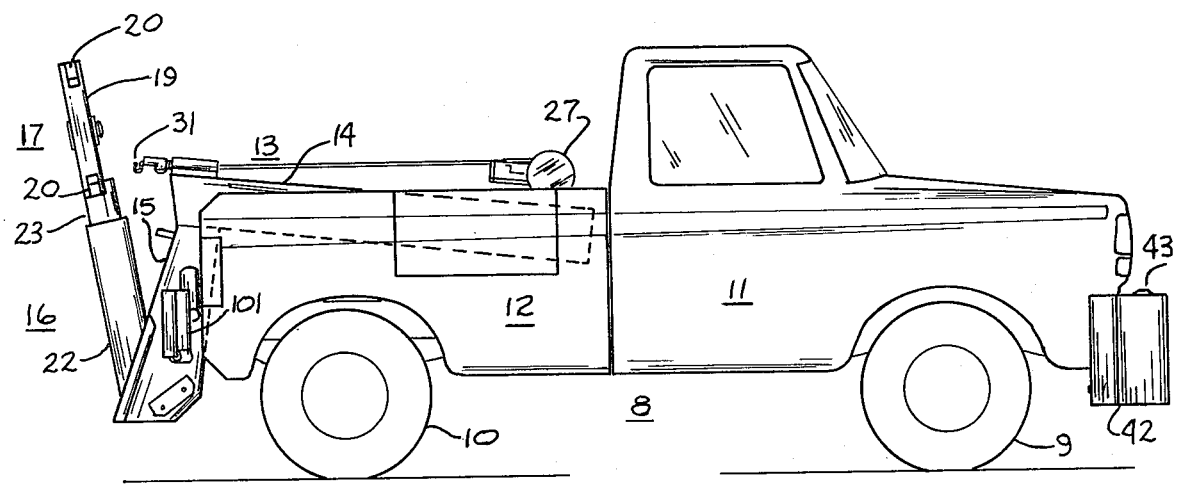
FIG. 2 is a side elevation of the truck of FIG. 1 with the equipment in its retracted or storing position.

The vehicle towing truck or "wrecker" 8 illustrated in FIG. 1 having front wheels 9 and rear wheels 10 comprises a cab or forward cab portion 11 and a rear or body portion 12. A crane 13 is pivoted on the rear portion 12 of the truck just to the rear of the cab. The crane includes a main boom 14 pivoted to the truck at its forward end and having a portion 15 extending downward from its rear end. The boom 14 and the portion 15 are rigidly secured together at an angle of somewhat over 90°, so that the end of the crane may be moved downwardly toward the ground over the rear of the truck. An extended tow bar member 16, herein sometimes referred to as the "stinger", is pivotally mounted at the end of the angular boom portion 15 for movement about a horizontal axis from the position shown in FIG. 1 to a storage position as shown in FIG. 2.

A lifting claw assembly comprising two pairs 17 of two-pronged disabled vehicle wheel engaging claw members is mounted on the tow bar member 16 the claw members being mounted on respective ends of a tow connection or cross bar 18. The bar 18 is a box-like structure comprising a pair of elongated spaced top and bottom plates rigidly connected together by two front side plates 18a and two rear side plates 18b all welded to the top and bottom plates. Each pair of claws 17 comprises a base member 19 and two spaced bowed claw prongs or arms 20, the prongs being concave on their facing sides; each of the base members is pivotally secured to a respective end of the tow cross bar 18 between the top and bottom plates and is rotatable about a removable pin 19' which provides an upright axis as viewed in FIG. 1. The claw base member 19 is provided with a plurality of holes for engagement with the pivot pin so that it may be pivotally mounted in the position shown or on either side thereof. This enables the operator to quickly adjust the position of the claws for different vehicle wheel spacings, the quick adjusting of the claws being made by moving the pivot pins. The prongs 20 remote from the truck are biased toward one another by a light spring 21 connected between the arms on the rear side of the bar 18. In this position the bars 19 rest against the outer ends of the rear side plates 18b which act as stops and the bars 19 lie at angles of about 45° with respect to the bar 18. These remote prongs are mounted so that they are lower than the near prongs; this has been found to facilitate the automatic positioning of the assembly below the wheels of the vehicle to be lifted.

The crane 13 as shown in FIG. 1 is constructed so that it may be lowered to position the tow bar member or stinger 16 close to the ground so that the member may be extended and located under a pair of the wheels of a disabled vehicle. The construction and arrangement of the pairs of claws 17 is such that they may be positioned automatically for engagement with the tires of the wheels and on lifting will cradle the wheels and lift the vehicle. As described below, this arrangement makes it possible to remove disabled vehicles from close quarter situations with minimum interference with traffic and frequently without requiring the operator to leave the tow truck cab.

The stinger 16 comprises a main body 22 and an extendable bar portion 23 telescoped therein. The cross bar 18 is pivotally mounted on the end of the portion 23 by a removable pivot pin 18' and is biased to its position normal to the axis of the stinger by two springs 24. Preferably, each of the springs 24 comprises a series of short springs linked together in the manner of a chain, each spring being tapered toward both ends. With this construction, the spring 24 readily collapses when it is on the side where it is required to shorten when the bar 18 is pivoted.

Figure 3:
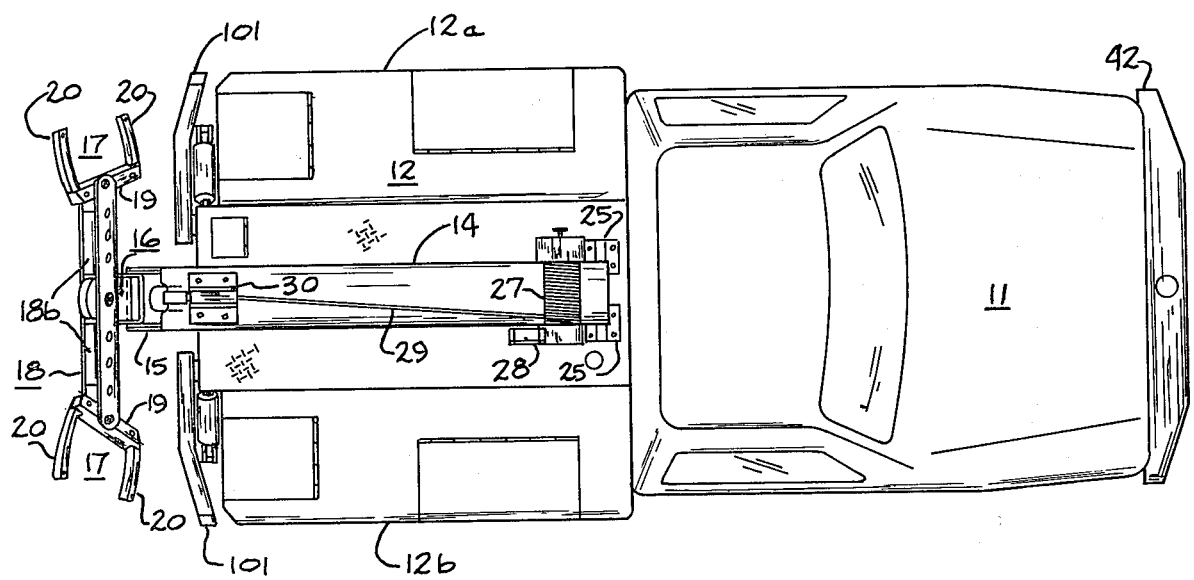
FIG. 3 is a plan view of the truck of FIG. 2.

As shown in FIGS. 2 and 3, the boom member 14 is pivotally secured to an anchor block 25 at the forward end of a hoist frame which is above and rigidly connected to the truck frame. The boom 14 is raised and lowered by operation of a hydraulically actuated tube or rod 26. A winch 27 driven by motor 28 is mounted on the top of the lower end of the boom, a cable 29 of the winch passes through a guide 30 at the rear end of the boom 14 and terminates in a suitable hook 31. Two spaced lateral guide blocks indicated at 32 in FIG. 18 are mounted on the hoist frame within the body for engagement with the sides of the boom member 15 to prevent lateral movement thereof in its lower positions.

The truck body includes two storage lockers 12a and 12b one on either side with suitable hatches to afford rear and side access to their interiors. These lockers provide for the storage of towing equipment, dolly wheels and supplies. The rear unloading safety feature allows the operator to unload the lockers while standing out of the traffic lane.

Figure 4:
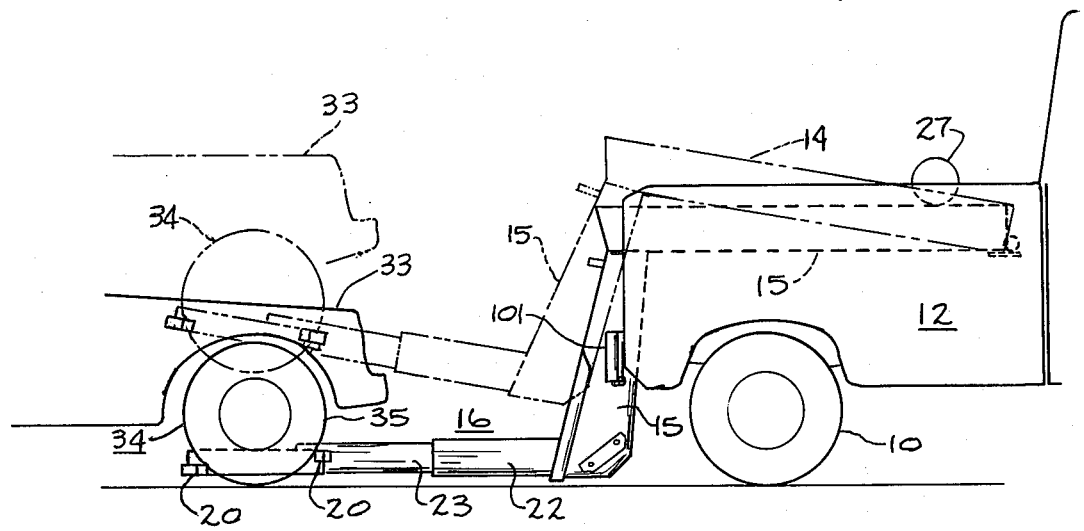
FIG. 4 is a side elevation view of the truck of FIG. 2 with the equipment in its loading position with the towing position indicated in dotted lines.

As shown in FIG. 4 a vehicle to be towed, the front end 33 of which is shown, may be lifted by the boom assembly when its front wheels 34 are positioned above the claw members. The prongs 20 of the claw members 17 are located on either side of the ground engaging portion of the tire 35 of the wheel 34. When the boom is lifted by operation of the hydraulic rod 26 the wheels are trapped and cradled in the respective claw members and the front end 33 of the vehicle may be raised to a position indicated in dashed and dotted lines. The vehicle may then be towed away by the truck. Safety straps, described below, may be attached to secure the wheels in the claws during transportation when there may be a bouncing or jolting of the vehicle. The safety straps may not be necessary for short distance tows and are not required when maneuvering the towed vehicle out of its position in the traffic line as the claws hold the wheels effectively except when there are severe jolts.

Figure 5:
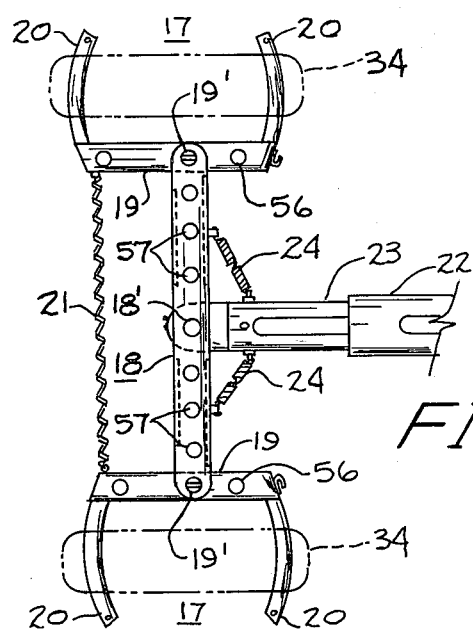
FIG. 5 is a plan view of the automobile wheel engaging equipment of FIG. 5.

This cradling of the wheels of the vehicle to be towed is illustrated in FIG. 5, in a plan view of the lifting claw assembly. This is a view showing the wheels with the prongs 20 in position below the two tires and ready to be lifted. In this position the bars 19 rest against stops (not shown) which limit them to a position normal to the longitudinal axis of the bar 18.

Figure 6:
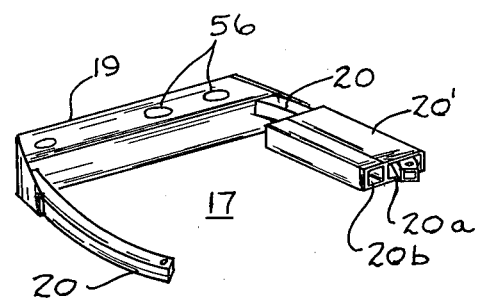
FIG. 6 is a perspective view of the wheel engaging equipment provided with a sleeve or sock for narrowing the spread of the claws.

FIG. 6 illustrates an arrangement for lifting the vehicle having tires much smaller than the average size or for lifting wheels without tires. In this figure the far prong 20 has been shown as fitted with a sleeve or sock 20' which is of rectangular cross section and is sufficiently wide to effectively reduce the spacing of the prongs. The sleeve is formed with two tubular passages 20a and 20b. The passage 20a fits over the prong 20 with its walls engaging the top and bottom surfaces of the prong, its width being sufficiently great to accommodate the curve of the prong. The other passage 20b is of a size to provide the required reduction of effective spacing between the two prongs 20. When needed for lifting a small wheel the sleeve may easily be slipped in place over the prong and will remain in place when the wheel is cradled in the claw member.

Figure 7:
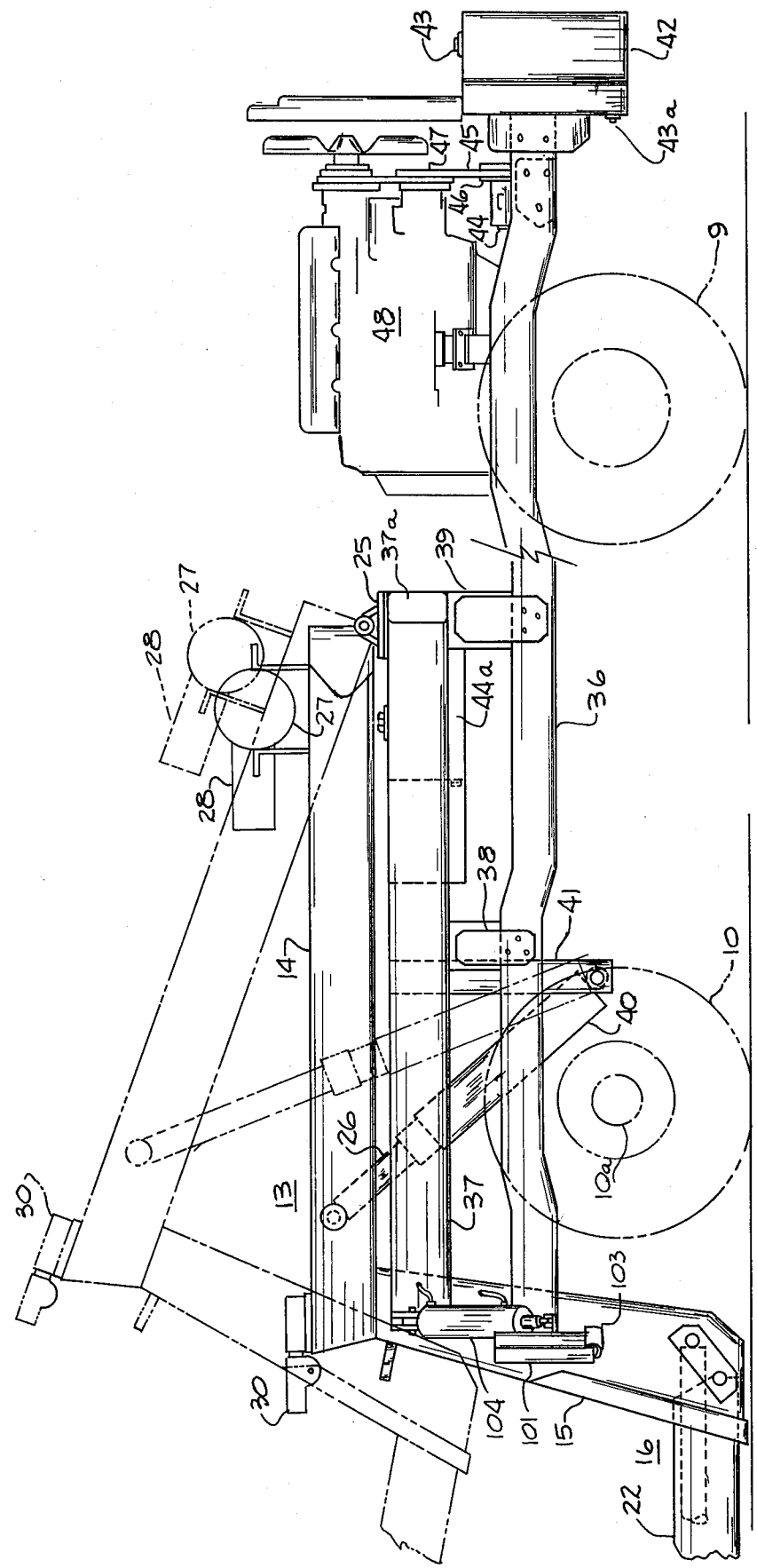
FIG. 7 is an enlarged side elevation view of the towing truck and crane with the body and cab removed and the truck frame broken away to omit the portion including the steering wheel and foot controls.

The construction of the hydraulic lifting mechanism is shown in FIG. 7 where the truck frame is indicated at 36. The wheel 10 is secured to the frame by conventional support mechanism including the vehicle springs (not shown). The crane and the storage lockers are supported on the longitudinal members of the truck frame indicated at 36, on a hoist frame 37 rigidly secured to the truck frame by rigid uprights. The two of these uprights on the near side are indicated at 38 and 39. All of these uprights are bolted or otherwise suitably secured to the longitudinal members of the truck frame. The hoist frame 37 comprises two laterally spaced elongated tubular members of rectangular cross section which are positioned above and spaced from the truck frame, and are thus substantially parallel to one another. The elongated members are connected at their forward ends by a cross member 37a of the same tubular material, and the anchor block 25 is rigidly secured to the cross member 37a. All of the loading on the hoist frame 37 thus is carried by the truck frame through the uprights 38 and 39 forward of the rear axle indicated at 10a. A hydraulic actuator including the tube 26 and a cylinder 40 is pivotally mounted on the lower end of a vertical support member 41 the upper end of which is welded or otherwise rigidly secured to the hoist frame 37. The tube or hollow rod 26 is actuated by hydraulic fluid under pressure supplied to the cylinder 40 in the usual manner; the closed upper end of the tube or rod 26 is pivoted on the boom 14 and raises the boom when hydraulic pressure is supplied to the cylinder. The pivoted end of the cylinder is forward of the axle 10a of the wheels 10 and thus when pressure is applied to the cylinder to lift the boom the force is applied forward of the rear axle so that it does not tend to tilt the truck backward about the rear axle. The hoist frame as stated before is not connected to the truck frame at any point rearward of the rear axle thus all loading on the frame is applied forward of the axle. This makes it possible to employ a smaller tow truck for handling a given lifting and towing load.

FIG. 7 shows an additional arrangement for applying force forward of the rear axle for increasing the loads which may be lifted by the crane. The front bumper of the tow truck, as indicated at 42, is constructed as a tank or container of substantial size at the front of the truck. This tank may be filled with water or other liquid and thereby increases the weight of the forward end of the truck and provides a counterweight for the boom. The tank is provided with a filler cap 43 and a drain plug 43a. The tank is constructed with heavy walls and resists damage from bumping or accident.

Hydraulic fluid is supplied under pressure to the boom actuators and other positioning devices by a pump 44 which is rigidly mounted on the frame 36. The pump is driven by a belt 45 connected between the pump pulley 46 and a driving pulley 47 mounted on the crankshaft of the truck engine indicated at 48; the torque effect on the engine block tending to cause rotation about the crankshaft thus is not transmitted to the pump. The mounting of the pump on the frame facilitates the location of the pump below the level of the hydraulic liquid supply or surge tank indicated at 44a.

Figure 8:
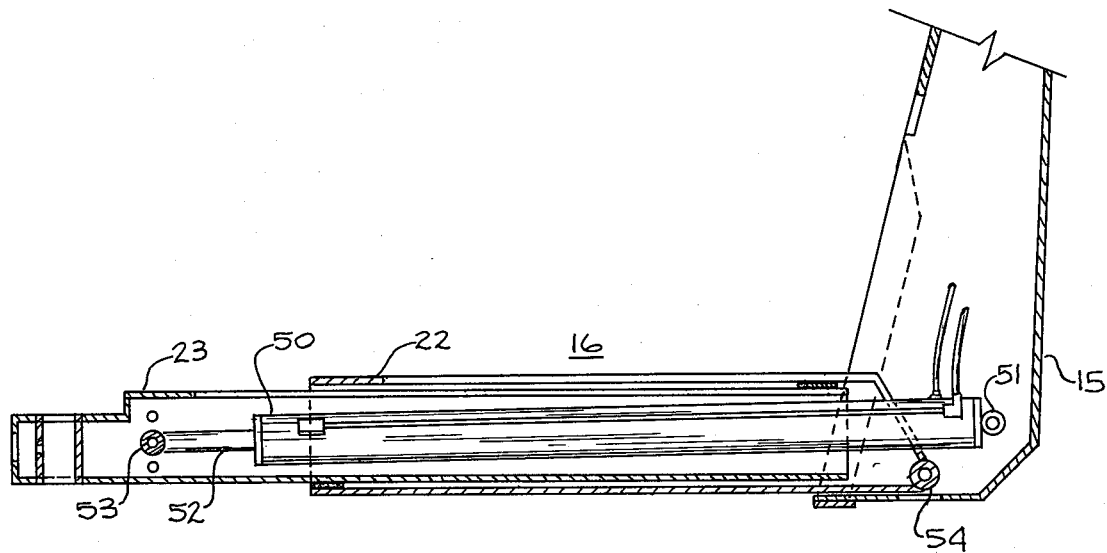
FIG. 8 is an enlarged sectional side elevation view of the extensible portion of the boom.
Figure 9:
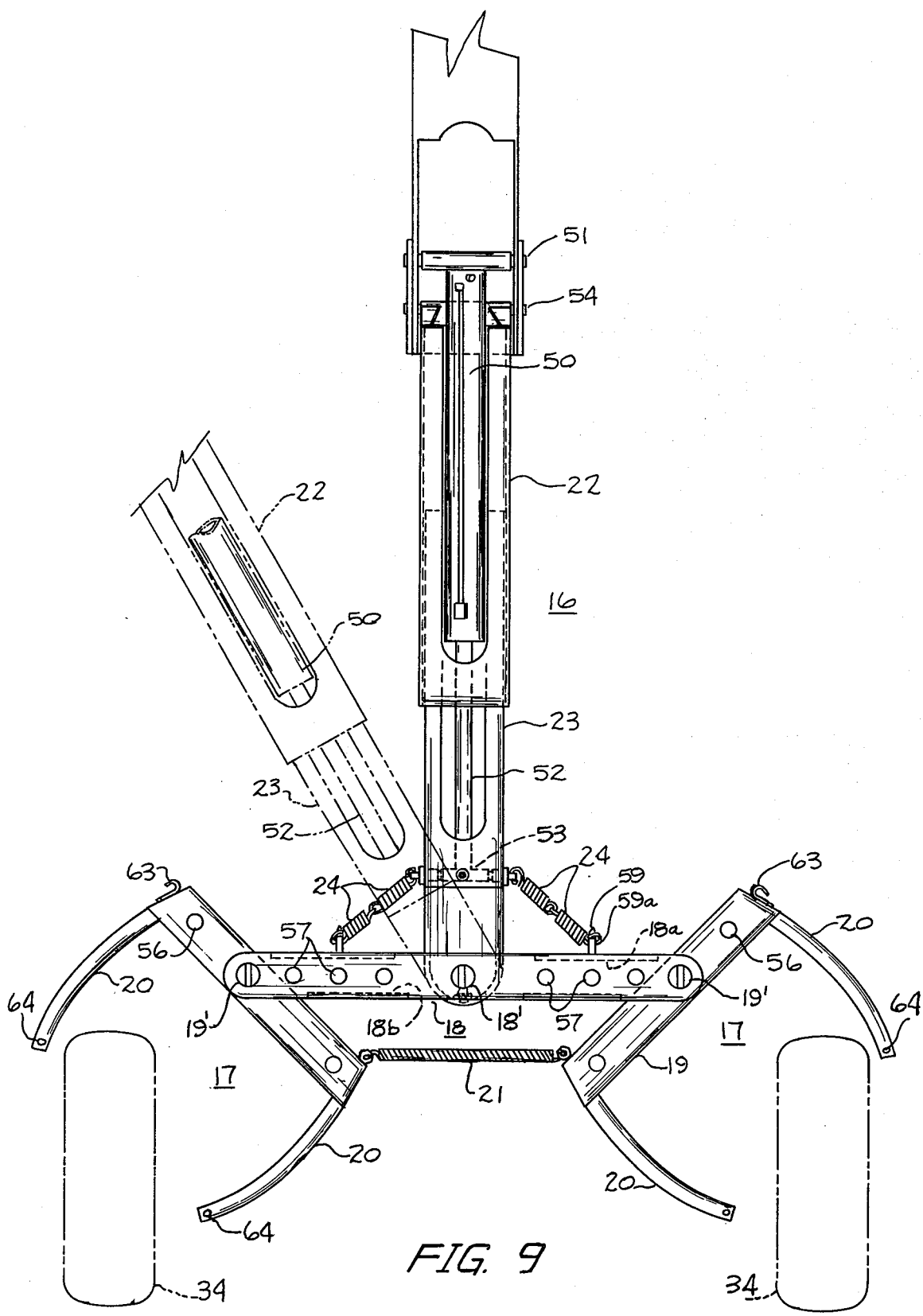
FIG. 9 is an enlarged plan view showing further details of the wheel engaging equipment.

Further details of the construction of the extensible tow bar or stinger 16 are shown in FIGS. 8 and 9. As shown in FIG. 8 the extensible inner member 23 is slidably mounted in the main body 22. A hydraulic actuating mechanism is arranged within the member 16 and comprises a two way pressure cylinder 50 pivoted to the lower end of the boom 15 at 51 and a piston (not shown) within the cylinder to which a drive rod 52 is attached, the rod being pivotally attached to the member 23 at 53. The main body 22 is pivotally secured to the bottom end of the boom 15 at 54.

In FIG. 8 the hydraulic mechanism is shown with the piston in its fully retracted horizontal position. If the claw assembly is to be extended hydraulic pressure is applied to the right hand side of the piston to move the rod 52 to the left to position the assembly as desired. If the member 16 is to be returned to its storage position as shown in FIGS. 2 and 3 the pressure is reversed and the member 23 is first retracted until it reaches the stop position shown in FIG. 8. Further pressure in the same direction will rotate the member 16 upwardly about the pivot 54 until it attains its upright position. Thus the same hydraulic cylinder and piston is effective to extend the portion 23 and to move the member about its pivot between its horizontal and upright positions. It will be understood that when the member 16 is in its upright position it is lowered by admitting pressure fluid to the cylinder 50 to the right of the piston therein, whereupon the member 16 is rotated toward its horizontal position.

Preferably, the hydraulic actuating devices are controlled by push buttons or other control members provided on a control box connected to the actuators by a remote control cable. The cable is flexible and of a length to allow the mechanism to be controlled from within and near the truck cab; a second box and a longer cable preferably is provided for controlling the mechanism from positions about the rear of the truck and near the vehicle to be towed or from positions around the rear of the truck.

FIG. 9 shows the stinger and the claw assembly in position adjacent a pair of wheels of a vehicle to be towed with the prongs 20 on the tow truck side of the assembly in position about to engage the tire when the boom is advanced toward the wheels. A second position of the boom is illustrated in dotted lines to show the manner in which the wheels may be engaged when the tow truck is not in straight alignment with the vehicle to be towed. In this angular position the centering spring which is on the obtuse angle side is stretched to allow swinging of the bar 18. The position of each of the pairs of claws with respect to the bar 18 may be changed by removing the pivot pin 19′, and moving the bar 19 to align selected ones of other holes 56 in the bars with the end holes of the bar 18. This arrangement provides flexibility for adjusting the claw assembly for specific tow attaching problems.

In the event that the claws cannot be used, for example when the wheel of the vehicle to be towed is damaged or missing, axle engaging forks (not shown) may be inserted in holes 57 in the bar 18 which are provided for this purpose. These forks are upwardly opening forks sized to receive an axle bar having a base or stem sized to fit the holes 57. The axle bar of the vehicle may be chained to the bar 18 for towing.

Figure 10:
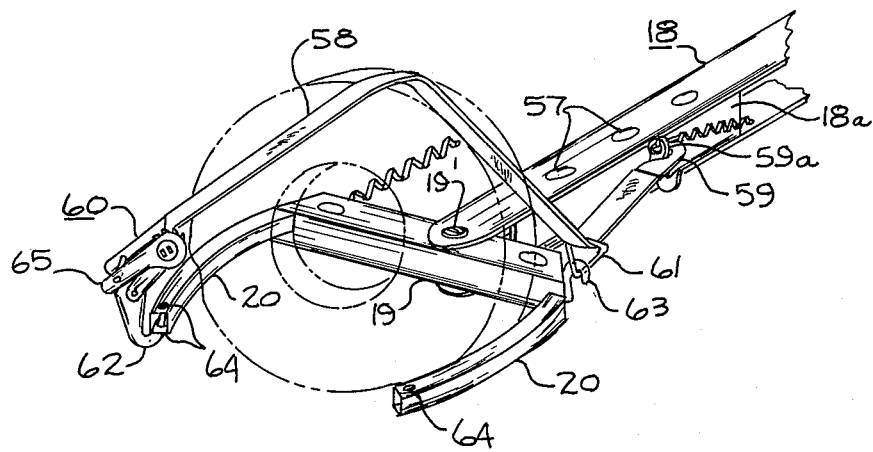
FIG. 10 is a perspective view of the claw assembly with a wheel secured by a safety belt, the wheel being shown in phantom.

When the wheels of the vehicle to be towed are cradled in the claw members and the vehicle is ready to be towed away, safety straps are secured over the wheels to hold the wheels securely in position on the claw members. The saftey straps as shown in FIG. 10 comprises a flexible strap 58 of woven plastic fiber capable of withstanding high tension loading. The strap has a flat metal hook 59 at one end and a ratchet take up or tightening device 60 secured to its other end. A closed delta ring 61 is threaded on the strap 58 between the hook 59 in an eye 59a which is welded or otherwise secured to the bar 18, and the ring 61 is engaged with a hook 63 rigidly attached to one end of the bar 19 adjacent the near prong 20. The strap is then placed over the tire on the wheel and drawn down toward the end of the opposite prong 20 where the hook 62 is engaged in holes 64 at the end of the prong. The device 60 is then operated to tighten the strap by back and forth ratchet operation of a handle 65. When the strap has been sufficiently tightened and is secure the wheel is ready for towing; a similar strap is used on the other wheel of the pair so that both wheels are secured for towing.

A suitable ratchet device for this safety strap application is Model MS Ratchet, Catalog No. E7700-1, sold by Aeroquip Inc. 1225 West Main Street, Van Wert, Ohio 45891.

The safety strap when secure and tight prevents dislodging of the wheels from the claw members and in addition locks the wheels in their forward positions, each of the bars 19 being held tightly against its stop 18a on the bar 18. Thus the safety straps when securely tightened against the wheels of the vehicle to be towed prevent separation of the wheels from the towing equipment due to jarring or bouncing during towing and also in the event of accidental dropping of the boom.

Figure 13:
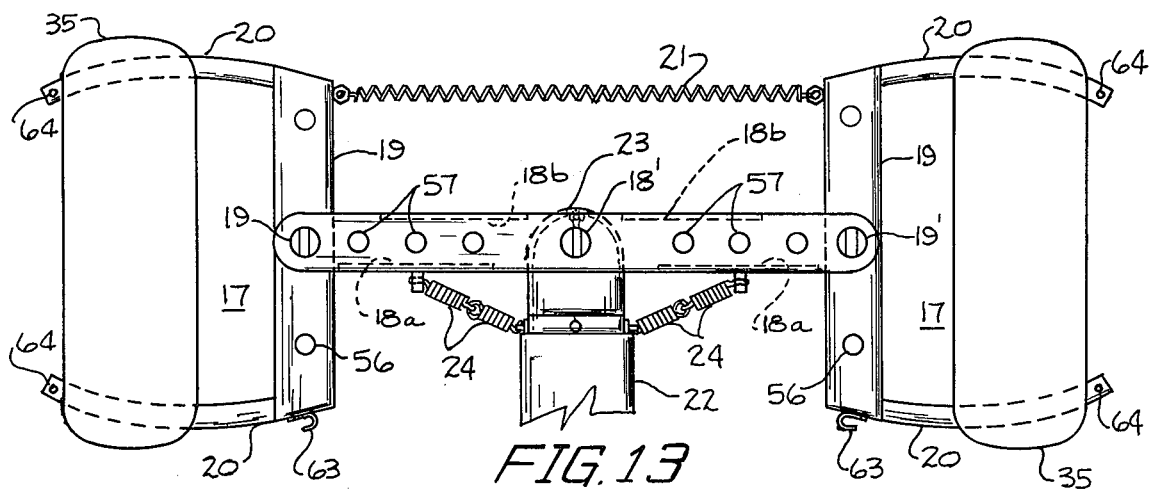
FIGS. 11, 12 and 13 are plan views of the equipment of FIG. 5 showing successive positions of the claw members during attachment to the wheels of a vehicle.
Figure 12:
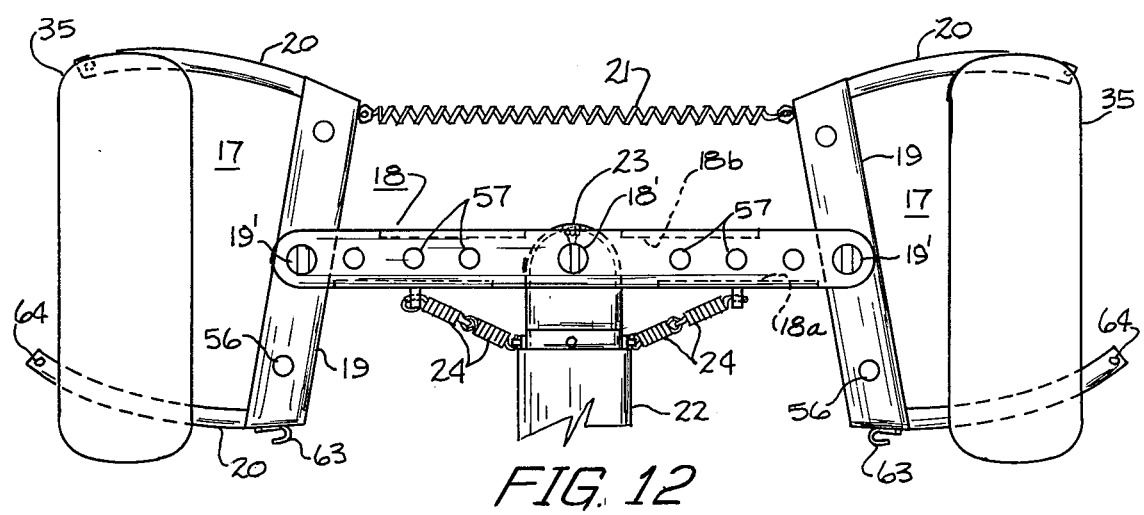
Figure 11:
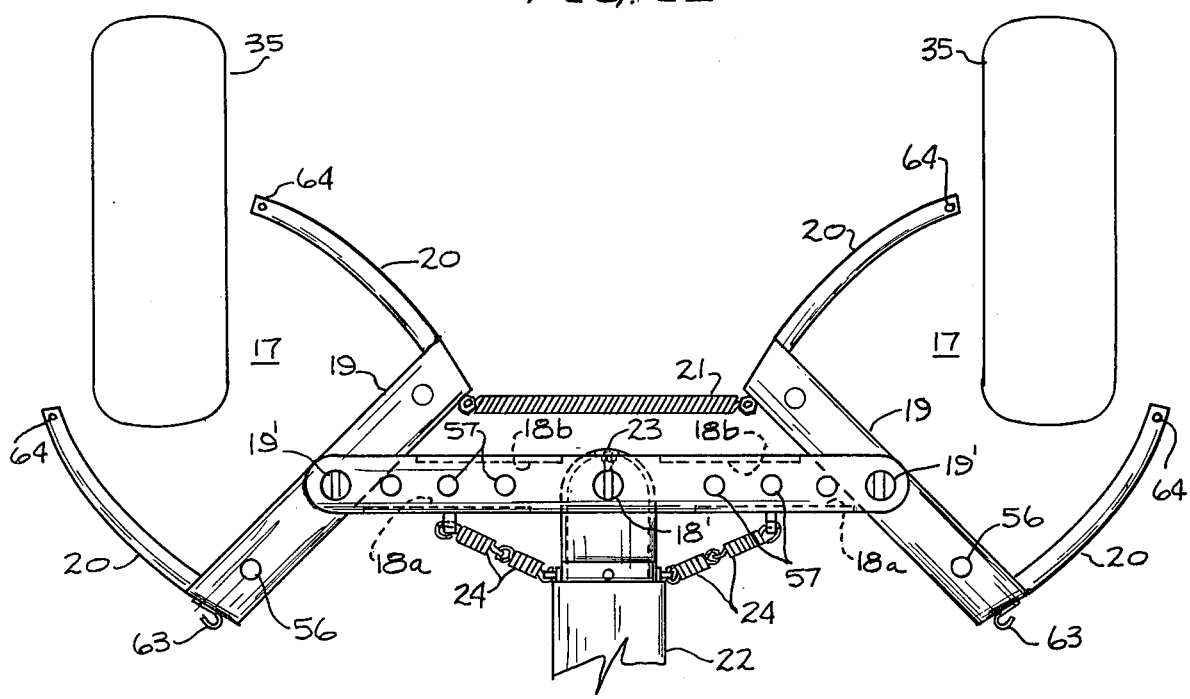

The manner in which the equipment of this invention may be operated to engage, pick up and move disabled vehicles will be apparent from the following description of FIGS. 11, 12 and 13.

In FIG. 11 the claw assembly is shown just entering the space between the pair of wheels 35 of the vehicle to be towed, the bars 19 resting against the stops 18b. The wheel spacing has been shown as near the minimum for the position of the approaching prongs 20 when the bar 19 is connected in its position near its center as shown. The vehicle wheel spacing is required to be such that the prongs 20 near the vehicle to be lifted will clear the wheels when the assembly approaches and the remote forward prongs will be engaged by the wheels as the assembly moves farther toward the vehicle. Should the wheel spacing be smaller one or both of the bars 19 may be moved to another pivot position nearer the prong on the side nearer the tow truck.

In FIGS. 11, 12 and 13 the bars 19 are shown pivoted on the bar 18 at the center of the bars 19 rather than in the off-center position shown in FIG. 5. Either position may be used and in such case a second position farther from the center is provided for selective locating of the pivot point.

As the assembly is moved toward the wheels of the vehicle to be lifted the prongs 20 nearer the two truck will engage the respective wheels 35 and will rotate the prong assemblies thereby moving the rear prongs which are remote from the truck toward and about the tires. It will be understood that the claw assembly is maintained close to the ground and that the prongs can enter the open areas on each side of the ground contact zone of the tire. In FIG. 12 the prongs have entered the spaces below the tires on each side of the ground engaging point. The assembly then is moved to the position of FIG. 13 wherein the bar 18 lies along the center line of the wheels and the prongs are equally positioned below the tires. In this position further rotation of the bars 19 is prevented by the stops 18a on the bar 18.

During the movement of the claw assembly from the position of FIG. 11 to that of FIG. 13 the pivotal mountings of the bar 18 and the bars 19 allow the assembly to position itself to engage the tire on one side or the other and to pivot into engagement with the other tire. Thus when the assembly is positioned so that both pairs of claws can move into position it is not necessary to effect precise positioning of the claws adjacent their respective wheels or to engage the two wheels simultaneously. When the member or stinger 16 is near the center of the space between the wheels the movement rearwardly to engage the wheel in the position of FIG. 13 is automatically effected, the assembly moving into the position required for lifting as the boom is moved rearwardly regardless of which wheel is engaged first by an approaching rearward prong 20.

The movement of the claw assembly toward its position under the vehicle to be lifted may be effected by extension of the boom by manipulation of the hydraulic pressure control or by backing the truck or both.

The inward bowing of the prongs 20 is along a curve approximating a circle and facilitates the automatic positioning action of the claw members. The internally facing bows effectively follow the tire surfaces when the prongs are being positioned about a wheel by engagement of the wheel with the prongs nearer the truck.

Damage to the body of the disabled vehicle is avoided because the lifting and towing connection to the vehicle is effected through the vehicle's own suspension system without direct engagement with the vehicle body. Both the tow truck and the towed vehicle are cushioned by their respective springs, and unsprung jolts to the bodies and frames and to the boom are greatly reduced. As a result, the present system is safer and more damage free than the conventional systems used heretofore.

When the claw assemblies are in the position of FIG. 13 the boom may be raised to cradle the vehicle wheels in the pairs of claws and to raise the vehicle to the required height for moving.

The automatic action of the claw assembly to position it under the wheels greatly reduces the number of times when the operator must leave his cab, and for many situations eliminates the need for the operator to work under the vehicle. Furthermore, the equipment saves time and greatly facilitates the retrieving of a vehicle from a close quarter position in a traffic line. Greater safety for the tow truck operators also results from the ease of attaching a tow without requiring the operator to work under the vehicle or even to leave his remote control position in the cab in many vehicle pick-up situations.

The action of the equipment over a wide range of angles to the direction of the vehicle to be towed makes it possible to retrieve and move a vehicle without having first to provide additional space between the tow truck and the vehicle.

FIG. 14 illustrates an embodiment of the invention wherein the spacing between the claw members may be adjusted quickly according to the wheel spacing of a vehicle to be lifted. The claw members and the boom are the same as those of the first embodiment and are designated by the same numerals. Instead of having the single cross bar 18 of the first embodiment this modification has a pair of pivoted bars 66 and 67 which are locked together in selected angular positions with respect to one another. The bars 66 and 67 are shown in their straight alignment positions for maximum spacing of the wheels to be lifted. The bars are of box-like construction like that of the bar 18 of the first embodiment and have locking sectors at their pivot ends. The sector of the bar 67 is of the same shape and lies directly below the sector 68 and a part of it appears in the dotted lines indicating the angular position. The bars are locked together by a pin 69 which passes through a selected one of a plurality of holes 70 in the sector 68 and into a corresponding hole in the sector of the bar 67. The pin locks the bars against movement with respect to one another.

Upon removal of the pin 69 the bars may be moved to other positions, as indicated, by way of example, by the dot and dash lines of FIG. 14. Here they are again locked by inserting the pin 69 through registering holes in the sectors.

The biasing of the bars to their normal position on the boom extension 16 is effected by springs 71 which are essentially the same as the springs 24 of FIG. 5. The claw assemblies are biased to their ready position by a spring 72 similar to the spring 21 of FIG. 5. In FIG. 14 the claw assemblies are shown in their wheel engaging positions for purposes of illustration.

The operation of the apparatus of FIG. 14 when the bars 66 and 67 are aligned as shown is essentially the same as that of the first embodiment. The present embodiment provides the further feature of angular adjustment and locking of the arms 66 and 67 for use when lifting vehicles having much smaller spacing of their wheels. For this use the biasing springs are released and the claw members are positioned manually by the operator rather than using the automatic positioning feature.

The embodiment of the invention which is illustrated in FIG. 15 is a claw assembly particularly suited for lifting heavy vehicles. The assembly is shown pivotally attached to the end of the extensible boom or stinger 16 and taking the place of the claw assembly of the first embodiment. The assembly is shown in its laterally retracted position in which it may be placed between the wheels of a truck, for example.

The assembly includes a tow connection or cross bar 73 which, as shown is FIG. 15a, is a tube of rectangular cross section. In order to attach the tube 73 to the stinger 16, top and bottom plates 74 and 75, respectively, are welded to the tube. These plates have shallow triangular extensions with holes to receive the pin 18' by which the tube is connected to the stinger. Springs 24a are attached between the stinger and the top plate 74 to bias the tube 73 to its position normal to the axis of the stinger. As shown in FIG. 15a, the pin 18' has an annular groove 76, and is retained in place by a threaded plug 77 which is screwed into the wall of a cylinder 78 welded to the member 23 and has a rounded end which enters the groove 76. The plug 77 is accessible through a hole 79 in the end of the member 23.

Two claw assemblies, indicated at 17a, are mounted for sliding movement in the ends of the tube 73. Each assembly includes a cross member 80 and two staight claws 81 extending normal to the member. The members 80 are slidably mounted in sleeves 82 at the outer ends of support members 83 which are telescoped with and slidable in the respective ends of the tube 73. The members 83 are smaller than the inside dimensions of the tube 73 and a plurality of spaced brass bushings or guide blocks 84 and 85 are provided on the inside of the tube 73 and the outside of the support members 83, respectively. The spaces between the blocks 84 allow the blocks 85 to pass between them when the support member is moved into or out of its position in the tube 73. Three holes 86 are provided in each member 80 for selective positioning of the sleeves, the sleeves being shown in the center position with the pin 87 passing through the sleeve into the center hole 86.

The claw assemblies may be advanced and retracted by operation of two-way hydraulic activators including cylinders 88 pivotally connected at their inner ends to the tube 73 and rods 89 pivotally connected to the members 83. The cylinders are supplied with fluid under pressure through lines 90 and 91, and the usual controls may be provided and may be arranged for independent or simultaneous operation of the tow actuators.

The prongs or claws 81 are mounted on the base members or cross arms 80 and each prong 81 is a straight length of angle steel; each pair of prongs includes one angle piece attached to the tow truck end of the cross arm 80 and a second piece which may be secured in any of the three positions, one shown in full lines and two indicated by dotted lines. The arm 80 is a piece of rectangular rolled steel tubing and is provided with holes shaped to accomodate the prongs. Each prong has notches near one end to fit the far side wall of the tube at the top of the hole and the near side wall at the bottom of the hole and prevents longitudinal displacement of the prongs when under load. A stop 92 on each prong limits its position in the cross arm 80. This feature is illustrated in FIG. 15b in which the tilted position of a prong 81 when first inserted in the hole in the arm 80 is indicated in dot and dash lines and the seated position is shown in full lines, the stop 92 resting against the arm 80.

The illustrated position of the claw assemblies 17a on the main body is the retracted position such that the outer ends of the top and bottom prongs in this view are separated by a distance less than the spacing of a pair of wheels of the vehicle to be lifted. The assembly can thus be positioned between the pair of wheels by positioning the end of the extension 16. The prongs being in alignment with the spaces on either side of the ground engaging portions of the tires may now be advanced toward the wheels by operation of the hydraulic actuators 88.

The pairs of prongs may thus be moved outwardly into their tire engaging positions so that the stinger or boom member may be lifted, the wheels cradled in the pairs of prongs, and the vehicle raised to towing position. For the purposes of this operation, the prongs on the top or far side of FIG. 15 may be selectively positioned in any one of the three holes and spaced according to the size of the tires on the wheels to be lifted.

The embodiment illustrated in FIGS. 16 and 17 is similar to that of FIG. 15 in that it is provided with a hydraulic mechanism for moving wheel engaging arms or prongs laterally outward toward the wheels and for withdrawing them. This arrangement includes a main body 93 which is a tube of rectangular cross section and of a length to engage the tires of the pairs of front and back wheels of the vehicle to be lifted. The outer ends of the body 93 thus provide the prongs on the truck side of the assembly. The prongs for the vehicle side of both pairs of prongs are mounted on arms 94 which are securely attached to tubular slides 95 which are slidable within the body 93 and are connected to the pistons (not shown) of hydraulic cylinders 96 by piston rods 97 driven by fluid pressure within the cylinders 96. The prongs remote from the truck and mounted on the arms 94, are indicated at 98, and are shown in their retracted position. In this position the outer ends of the prongs are spaced from one another a distance less than the spacing of the wheels of the vehicle to be lifted.

The tubular body 93 is pivoted on the extensible member 23 of the stinger 16 by a pin 99 which acts as the pivot and passes through the two arms of a clevis 100 and through the end of the boom or stinger in the clevis. The body 93 is biased to a position normal to the boom portion or stinger 16 by springs 24b. Thus when the boom is moved toward a pair of wheels one end of the body 93 will strike one of the wheels and then the other so that it engages both wheels, whereupon the hydraulic pistons (not shown) which drive the rods 97 may be actuated to move the prongs 98 and locate them under the other sides of the wheels from the tubular section or body 93. This arrangement facilitates the locating of the prongs and lifting of the wheels while requiring little, if any, presence of the operator in the area under the vehicle. For the purpose of this control it is preferred that the hydraulic control be located on a portable unit connected to the hydraulic control of the system by a substantial length of cable.

In the use of all the embodiments it is desirable, particularly for winching operations, that the truck body and thus the crane can be freed from movement due to the flexing of the tow-truck springs. This may be accomplished by providing a direct ground rest for the hoist or boom frame. The construction illustrated in FIG. 18 is suited to provide this stabilizing function. The rear bumpers of the tow truck which are indicated at 101 in FIGS. 1 through 4, 7 and 18 are constructed to perform this function.

As shown in FIG. 18 the rear bumpers 101 are pivoted at 102 on the truck frame for rotation about an axis parallel to the longitudinal axis of the truck. The outer ends of the bumpers are provided with contact bottom ends of circular ring configuration. Two-way hydraulic actuators each including a cylinder 104 and a piston rod 105 are arranged to rotate the bumpers 101 about the pivots 102. The cylinders 104 are pivoted in clevis-like fittings 106 which are rigidly secured to the truck frame. The piston rods are similarly pivoted to the bumpers 101 by fittings 107 to allow relative movement of the piston rods with respect to the bumpers. This arrangement provides a combined bumper and hydraulically positioned outrigger for supporting the crane load directly on the ground.

In the raised positions of the bumpers, as shown in full lines, they are effective as the truck bumpers in the usual manner. When it is desired to stabilize the truck with respect to the ground for operation of the crane, hydraulic pressure is supplied to the cylinders in the usual way and the bumpers are moved downwardly until the shoes 103 press against the ground on their respective sides of the truck. The hydraulic actuators are controlled to maintain the pressure against the ground so that any forces created by operation of the crane will be transmitted directly to the ground and not through the spring system of the truck. Thus the full force of the crane is applied to the vehicle lifting operation without modification due to the flexing action of the vehicle springs. The effect of the firm contact of the bumpers and the ground is to provide a rigid connection between the crane and the ground providing maximum ground contact particularly during use of the winch to minimize stress on the truck frame and axles. After the winching operation has been completed, the hydraulic actuators 104 are actuated by pressure fluid admitted to their opposite ends to return the bumpers to their normal positions.

As pointed out above the load or weight on the hoist frame is applied forward of the rear axle of the truck. This arrangement is used in order to provide maximum towing capacity. It will also be noted that the hoist frame supports 38 are in compression when the crane is loaded and the supports 39 are in tension. These supports are positioned so that maximum leverage and weight during operation of the crane are applied forward of the rear axle of the truck. The connection of the hydraulic actuator between the hoist frame 37 and the truck frame 36 does not transfer any of the laod from the hoist frame to the truck frame because any force on the hoist frame merely rotates the bumpers about their pivots 102 and no load can be transferred. It is only when the bumpers engage the ground that they transfer load from the truck and hoist frame to the ground. The axle, spring and wheel weights remain on the ground whether or not the bumper outrigger is in engagement with the ground.

From the foregoing it will be clear that this invention has provided a wrecking truck vehicle hoisting and carrying system which may be connected and operated in a much shorter time than present commonly used systems and which does not contact or engage the body of the vehicle to be towed and thus does not damage the body of the vehicle and, further, suspends the vehicle to be towed on its own spring system thereby minimizing the effect of jarring or bumping of the wheels of the vehicle.

While the invention has been described in connection with specific embodiments thereof various other modifications and arrangements will occur to those skilled in the art. Therefore, it is not desired that the invention be limited to the specific details illustrated and dscribed and it is intended by the appended claims to cover all modifications and applications which fall within the spirit and scope of the invention.

I claim:

1. In an automotive vehicle lifting and towing truck equipment or the like having a rearwardly extending crane and means for positioning a substantial end portion of the crane close to the ground for vehicle lifting purposes, the improvement which comprises:

a pair of two-pronged outwardly and oppositely opening claw members each having spaced prongs adapted to be positioned below a wheel one prong on each side of the ground contact of the wheel, said pair being adapted when said prongs are so positioned and lifted to cradle a pair of wheels of the vehicle, means for attaching said claw members near the end of said portion of said crane and adapting said pair of members to be swingable about an intermediate upright axis whereby said pair of claw members may be positioned along lines at selected angles with respect to the longitudinal axis of said end portion of said crane, means effective on positioning of said attaching means near the ground and between a pair of wheels of a vehicle to be towed for locating said claw members directly under respective ones of the wheels with the prongs positioned on opposite sides of the ground engaging portion of the respective wheels whereupon the lifting of said crane portion will lift the vehicle with the pair of wheels cradled in said claw members, and the further improvement wherein said means effective upon positioning of said attaching means is actuated by engagement of a prong of each pair with a respective one of the wheels.

2. In an automotive vehicle lifting and towing truck equipment or the like having a rearwardly extending crane and means for positioning a substantial end portion of the crane close to the ground for vehicle lifting purposes, the improvement which comprises:

a pair of two-pronged outwardly and oppositely opening claw members each having spaced prongs adapted to be positioned below a wheel one prong on each side of the ground contact of the wheel, said pair being adapted when said prongs are so positioned and lifted to cradle a pair of wheels of the vehicle, means for attaching said claw members near the end of said portion of said crane and adapting said pair of members to be swingable about an intermediate upright axis whereby said pair of claw members may be positioned along lines at selected angles with respect to the longitudinal axis of said end portion of said crane, means effective on positioning of said attaching means near the ground and between a pair of wheels of a vehicle to be towed for locating said claw members directly under respective ones of the wheels with the prongs positioned on opposite sides of the ground engaging portion of the respective wheels whereupon the lifting of said crane portion will lift the vehicle with the pair of wheels cradled in said claw members, and including the further improvement wherein each of said pair of claw members is pivotally mounted on said attaching means and including means biasing said pair inwardly toward one another on their sides remote from said end portion whereby said pair of claw members is open rearwardly of the truck and upon movment of said attaching means toward a pair of automotive vehicle wheels the respective inner sides of said claw members on the side of the attaching means adjacent the truck first engage the wheels and the pair of claws are rotated against the force of the biasing means and move the far prongs of the claw members under the wheels on the sides away from the truck, whereby the means for mounting may be lifted to cradle the wheels in said claw members and lift the automotive vehicle.

3. In an automotive vehicle lifting and towing truck equipment and improvement thereon as recited in claim 1 the further improvement wherein said means for attaching said claw members includes a cross bar having a length less than the spacing of the pairs of wheels of a vehicle to be towed and pivotally mounted intermediate its ends near the end of said end portion of said crane and wherein said claw members are attached one near one end of said bar and the other near the other end thereof.

4. In an automotive vehicle lifting and towing truck equipment and improvement as set forth in claim 1 or claim 3 the further improvement wherein the prongs of said claw members of each pair are bowed whereby they are concave on their facing sides.

5. In an automotive vehicle lifting and towing truck equipment and improvement as set forth in claim 1 wherein said means for locating said claw members is dependent upon the engagement of the prongs of said pairs nearer the crane with both wheels of the vehicle to be towed to position said pair of claw members along a line substantially parallel to the axis of the pair of wheels of the vehicle.

6. In an automotive vehicle lifting and towing truck equipment the improvement thereon as recited in claim 1 wherein the truck frame is mounted on the wheels by means including springs affording relative vertical movement between the frame and the wheels and including the further improvement comprising a pair of rigid elongated bumpers adapted to be secured to the frame of the truck for swinging movement about a horizontal axis parallel to the longitudinal axis of the vehicle and having lengths sufficient to reach the ground, and hydraulic actuating means for rotating said bumpers and for retaining them against the ground whereby the weight of the rear portion of the truck is carried directly to the ground by said bumpers and the forces resulting from operation of the crane are not affected by the flexibility of the rear springs of the truck.

7. In an automotive vehicle lifting and towing truck equipment and improvement as set forth in claim 1, the further improvement wherein said crane includes a main boom adapted to be pivoted about a horizontal axis forwardly of the rear axle of the truck and having an arm extending downwardly from the outer end of said boom and having said end portion extending rearwardly from the lower end of said arm, said bar being pivoted on the outer end of said end portion, and including power lifting means connected to said boom and positioned to engage the frame of the truck forwardly of the rear axle of the truck for lifting the crane whereby the lifting force of said power means tends to hold the forward end of the truck downwardly about the rear axle.

8. In an automotive vehicle lifting and towing truck as set forth in claim 7 the further improvement which comprises an elongated tank extending across the truck at the front end thereof, said tank being adapted to be filled with liquid to provide a counter balancing weight opposing the lifted load on said main boom.

9. In an automotive vehicle lifting and towing truck as set forth in claim 8 the further improvement wherein said tank is constructed of heavy steel and constitutes the front bumper of said truck.

10. In an automotive vehicle lifting and towing truck equipment as set forth in claim 7 the further improvement which comprises a pulley mounted at the outer end of said main boom and a winch near the other end thereof for using said main boom as a simple crane, and lateral guide members mounted near the rear end of the truck in position on the two sides of said downwardly extending arm in a lower range of positions for preventing lateral movement of said crane when said arm is between said guide members.

11. In an automotive vehicle lifting and towing truck equipment and improvement as recited in claim 2 the further improvement including means providing a plurality of positions for pivotally mounting each of said claw members on said cross bar.

12. In an automotive vehicle lifting and towing truck equipment as set forth in claim 1 or claim 2 the further improvement wherein said attaching means comprises two bars each having a length less than one-half the spacing of the pairs of wheels of a vehicle to be towed, each of said bars being pivotally mounted on the end portion of said crane, and means for locking said bars in alignment with one another in one position and at a selected angle with one another in a second position, said second position affording use of said claw members for lifting a vehicle of smaller wheel spacing than that of the alignment position of said bars.

13. In an automotive vehicle lifting and towing equipment and improvement as set forth in claim 2 the further improvement wherein said attaching means includes a cross bar having a length less than the spacing of the pairs of wheels of the vehicle to be towed and pivotally mounted intermediate its ends near the end of said end portion of said crane and wherein each of said pairs of claws is pivotally mounted on said cross bar at respective ends thereof.

14. In an automotive vehicle lifting and towing truck equipment and improvement thereon as set forth in claim 2 the further improvement including means for biasing said cross bar toward its position normal to the longitudinal axis of said portion of said crane.

15. In an automobile vehicle lifting and towing truck equipment and improvement thereon as recited in claim 2 the further improvement wherein the prong of each pair on the side of the pair remote from the towing vehicle is lower than the other prong of the respective pair.

16. In an automobile lifting and towing truck equipment as set forth in claim 2, the further improvement which includes at least one stop on said attaching means for limiting the pivotal movement of said claw members against the force of said biasing means to the forward position of the wheels, and means for locking the wheels of a vehicle in said claws for preventing dislodging of the wheels during towing of the vehicle, said locking means including a flexible strap of high tension material and means for attaching one end of said strap to the outer end of the far prong of a claw member, a slidable member on said strap and means for attaching the slidable member to the claw member near the base of the near prong, means for attaching the other end of said strap to said claw member attaching means, and a ratchet device secured to said strap for tightening said strap whereby said strap may be attached to said outer end of said far prong passed over the top of the wheel of the vehicle and down to attach said slidable member near the base of said near prong and attaching the other end of the strap to said claw member attaching means whereby the strap when said ratchet device is operated draws the wheel tightly against said prongs and said claw member securely against said stop to lock the wheel in its forward position.

17. The invention of claim 16 wherein said slidable member is a delta ring.

18. In an automotive vehicle lifting and towing truck equipment or the like having a rearwardly extending crane and means for positioning a substantial end portion of the crane close to the ground for vehicle lifting purposes, the improvement which comprises:

a pair of two-pronged outwardly and oppositely opening claw members each having spaced prongs adapted to be positioned below a wheel one prong on each side of the ground contact of the wheel, said pair being adapted when said prongs are so positioned and lifted to cradle a pair of wheels of the vehicle, means for attaching said claw members near the end of said portion of said crane and adapting said pair of members to be swingable about an intermediate upright axis whereby said pair of claw members may be positioned along lines at selected angles with respect to the longitudinal axis of said end portion of said crane, means effective on positioning of said attaching means near the ground and between a pair of wheels of a vehicle to be towed for locating said claw members directly under respective ones of the wheels with the prongs positioned on opposite sides of the ground engaging portion of the respective wheels whereupon the lifting of said crane portion will lift the vehicle with the pair of wheels cradled in said claw members, and the further improvement wherein said end portion of the crane is a substantially straight elongated member including a longitudinally movable section and pivoted on said crane about a horizontal axis, said elongated member being movable from a position substantially parallel to the ground to an upright position, the further improvement which comprises a power means mounted on said elongated member for selectively moving said section longitudinally outwardly and inwardly and effective in its innermost position for swinging said end portion to and from its upright position.

19. In an automotive vehicle lifting and towing truck as set forth in claim 18 the further improvement wherein said means for attaching said claw members includes a cross bar having a length less than the spacing of the pairs of wheels of a vehicle to be towed and pivotally mounted intermediate its ends near the end of said end portion of said crane and wherein said claw members are attached one near one end of said bar and the other near the other end thereof.

20. In an automotive vehicle lifting and towing truck equipment and improvement as set forth in claim 18 or claim 19 the further improvement wherein said power means includes a hydraulic cylinder and piston mounted in said elongated member adapted to hold said member in its upright position and on initial movement therefrom to lower said member to its position near the ground and on further movement to move said longitudinally movable section outwardly and being effective upon reversal to retract said section and thereafter to raise said section to its upright position.

21. In an automotive vehicle lifting and towing truck as set forth in claim 20 the further improvement which comprises a hydraulic fluid pump rigidly mounted on the frame of said truck, means including a pulley mounted for rotation on the crank shaft of the engine for driving said pump whereby the operation of said pump is not affected by the torque effect on the engine, and a hydraulic fluid supply tank connected to said pump and mounted on said truck above the level of said pump.

22. In an automotive vehicle lifting and towing equipment or the like having a rearwardly extending crane and means for positioning a substantial end portion of the crane close to the ground for vehicle lifting purposes, the improvement which comprises:

a pair of two-pronged outwardly and oppositely opening claw members each having spaced prongs adapted to be positioned below a wheel one prong on each side of the ground contact of the wheel, said pair being adapted when said prongs are so positioned and lifted to cradle a pair of wheels of the vehicle, means for attaching said claw members near the end of said portion of said crane and adapting said pair of members to be swingable about an intermediate upright axis whereby said pair of claw members may be positioned along lines at selected angles with respect to the longitudinal axis of said end portion of said crane, means effective on positioning of said attaching means near the ground and between a pair of wheels of a vehicle to be towed for locating said claw members directly under respective ones of the wheels with the prongs positioned on opposite sides of the ground engaging portion of the respective wheels whereupon the lifting of said crane portion will lift the vehicle with the pair of wheels cradled in said claw members, said improvement further including a detachable boot for mounting on one of said prongs for decreasing the effective distance between said prongs to afford quick adjustment of the spacing of the prongs for lifting a wheel having a diameter too small for effective lifting by said pair of prongs.

23. In an automotive vehicle lifting and towing truck equipment and improvement thereon as recited in claim 22 the further improvement wherein the prong of each pair on the side of the pair remote from the towing vehicle is lower than the other prong of the respective pair.

24. In an automotive vehicle lifting and towing truck equipment and improvement thereon as recited in claim 23 the further improvement wherein said means for attaching said claw members includes a cross bar having a length less than the spacing of the pairs of wheels of a vehicle to be towed and pivotally mounted intermediate its ends near the end of said end portion of said crane and wherein said claw members are attached one near one end of said bar and the other near the other end thereof.

25. In an automotive vehicle lifting and towing truck equipment and improvement as recited in claim 22 the further improvement wherein said means for attaching said claw members includes a cross bar having a length less than the spacing of the pairs of wheels of a vehicle to be towed and pivotally mounted intermediate its ends near the end of said end portion of said crane and wherein said claw members are attached one near one end of said bar and the other near the other end thereof.

26. In an automotive vehicle lifting and towing truck equipment and improvement as recited in claim 22 or in claim 25 the further improvement including means providing a plurality of positions for pivotally mounting each of said claw members on said attaching means.

27. In an automotive vehicle lifting and towing truck equipment or the like having a rearwardly positioned boom member, the improvement comprising:

a pair of two-pronged oppositely opening claw members each constructed and arranged to be positioned below a vehicle wheel one prong on each side of the ground contact of the wheel, said pair being adapted when said prongs are so positioned and lifted to cradle a pair of wheels of a vehicle;

means for mounting said claw members near the end of said boom member and for positioning the claw members adjacent respective ones of a pair of vehicle wheels, means effective upon the positioning of said claw members adjacent respective ones of a pair of vehicle wheels for locating said claw members in position below the wheels whereby upon lifting of said boom member the wheels are cradled in said claw members and vehicle may be lifted to a position for towing, and including the further improvement wherein said means effective upon positioning of said claw members is actuated by engagement of a prong of each pair with a respective one of the wheels.

28. The invention as set forth in claim 27 including means for extending and retracting said boom member.

* * * * *